United States Patent [19]

Spiller

[11] Patent Number: 4,550,523

[45] Date of Patent: Nov. 5, 1985

[54] DISPOSABLE OR REUSABLE ANIMAL TRAP

[76] Inventor: Robert S. Spiller, 24676 Mendocino Ct., Laguna Hills, Calif.

[21] Appl. No.: 569,223

[22] Filed: Jan. 9, 1984

[51] Int. Cl.[4] ............................................. A01M 23/02
[52] U.S. Cl. .................................................... 43/61
[58] Field of Search .......................... 43/61, 62, 58, 59

[56] References Cited

U.S. PATENT DOCUMENTS

| | | | |
|---|---|---|---|
| 1,273,185 | 7/1918 | Reich | 43/61 |
| 1,581,297 | 4/1926 | Schmuck | 43/60 |
| 2,475,462 | 7/1949 | Rosen | 43/61 |
| 2,485,319 | 10/1949 | Rosen | 43/61 |
| 2,885,820 | 5/1959 | Maggio | 43/61 |
| 3,177,608 | 4/1965 | Lindelow | 43/61 |
| 4,144,667 | 3/1979 | Souza | 43/61 |
| 4,232,472 | 11/1980 | Muelling | 43/61 |
| 4,379,374 | 4/1983 | Lindley | 43/61 |

*Primary Examiner*—Gene P. Crosby
*Attorney, Agent, or Firm*—Harold Jackson

[57] ABSTRACT

A reusable or disposable rodent trap, having only two discrete parts, consisting of an unstable, tiltable enclosure, upon whose exterior surface is mounted a rotating door member with elongated side panels, which is prevented from rotating whenever the entrance side of the enclosure is downwardly inclined. Contact between the elongated door side panels, and the surface upon which the downwardly inclined enclosure rests, provides the rotational impediment. A rodent traversing the length of the enclosure to reach bait at the closed end causes the enclosure to incline upwardly, allowing the door to rotate closed by gravity. The rodent's return to the entrance end causes the enclosure to again assume a downward inclination. Since the door cannot be rotated in either direction when the enclosure is downwardly inclined, the rodent cannot open the door when proximate to it. The rodent, which will die of asphyxiation within hours, may be disposed of by simply inverting the trap.

9 Claims, 8 Drawing Figures

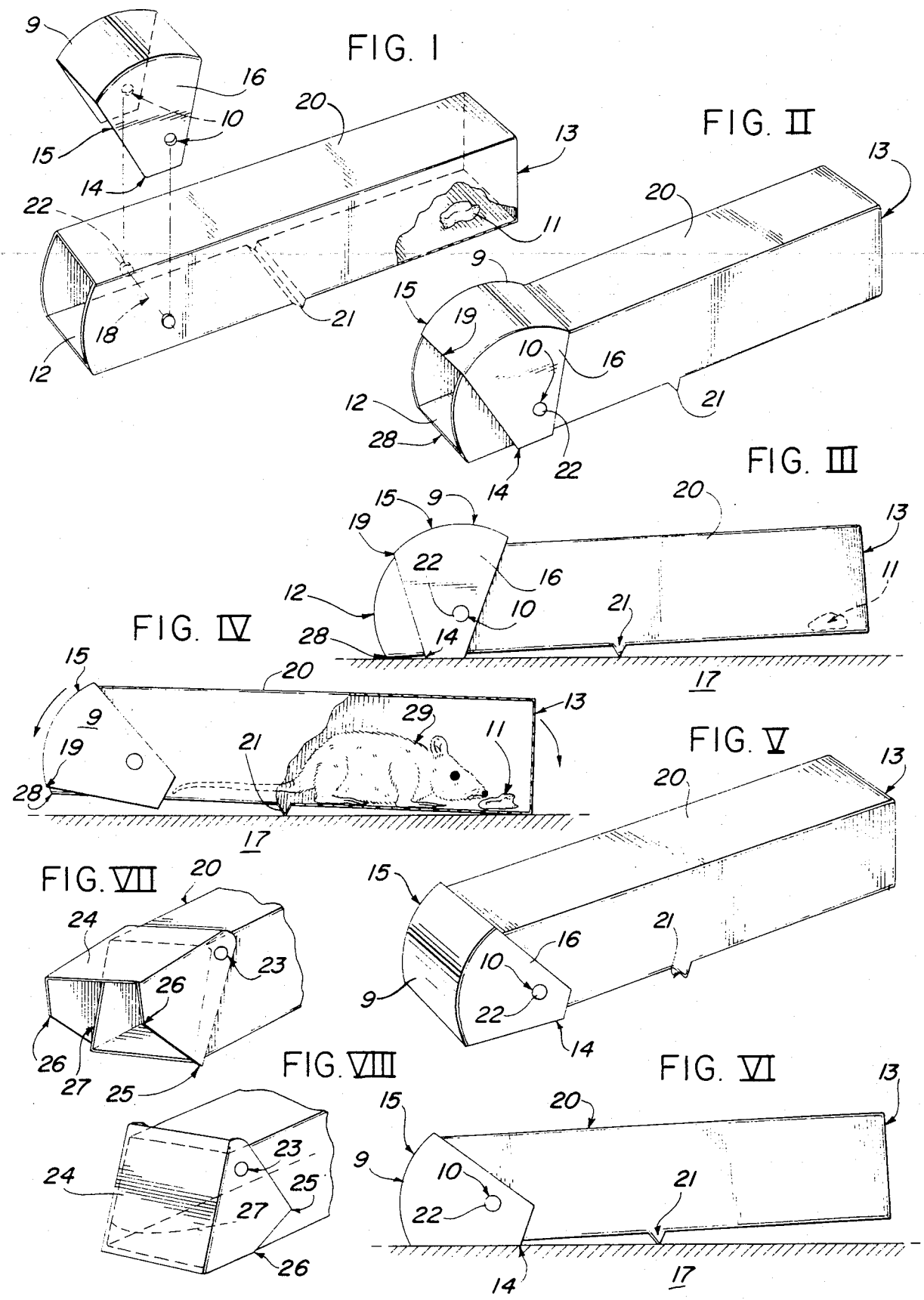

DISPOSABLE OR REUSABLE ANIMAL TRAP

BACKGROUND OF THE INVENTION

1. Field of the Invention

This invention relates generally to animal traps, and particularly to rodent traps, which may be manufactured inexpensively enough to permit single use entrapment of mice and rats, the trap and contained animal being disposable, or, alternatively, may be simply reused after disposal of the trapped animal.

2. Brief Description of the Prior Art

Rodent traps can be generally divided into two broad classifications: those that kill and mutilate the animal, such as the familiar spring-loaded snap trap, and those that trap the animal live in an enclosure. The live traps, by design, can be either disposable and/or reusable.

The mutilating traps have the advantage of being inexpensive, and therefore disposable, but have numerous disadvantages, such as being unsanitary and unsightly after the animal has been trapped, dangerous to pets and children, difficult to set, not completely reliable in preventing bait theft by a wily rodent, and aesthetically revolting to dispose of.

The live traps, while eliminating all of these disadvantages, have been plagued by a heretofore common problem that has discouraged wide commercial acceptance—they are expensive relative to the snap type traps, typically costing several times as much. This can be attributed to an excessive number of component parts with expensive mold and assembly costs, and, especially, an enclosure body typically requiring injection molding of at least two parts which must then be assembled.

The fewest number of component parts in a non-mutilating disposable trap appears to be five, set forth in the U.S. Pat. No. 4,144,667, to Souza, which appears to require injection molding of the two-part enlosure. U.S. Pat. No. 4,232,472 to Muelling, is another similar example of a claim at simplicity of manufacture, although no claim is made for disposability. This enclosure also appears to require injection molding. The U.S. Pat. No. 4,379,374 to Lindley, uses the weight of the rodent to trigger movment of the enclosure body, which is a principle that is utilized in the present trap, but in an entirely different manner. Lindley appears to have many component parts.

SUMMARY OF THE INVENTION

The present trap consists of only two discrete parts, with the larger component, the enclosure, designed to accommodate blow (or bottle) molding. The ability to blow mold the enclosure is facilitated by a thin, uniform wall thickness with no holes or other cutouts (other than the entrance opening), and a door with a closing mechanism operting on the exterior, rather than the interior, of the enclosure.

Simplicity of door operation is achieved by (1) a gravity drop door triggered by the rodent's weight on an unstable lever, which is the enclosure itself, and (2) maintenance of closure effectively resulting from the weight of enclosure and rodent on part of the closed door, and an interior door surface resistant to the application of an opening force.

A live rodent is entrapped, which may die of asphyxiation unless released. The trap's inexpensive manufacture is designed to afford the option of disposing of the trap along with the entrapped animal, or simple reuse after disposing of the animal.

BRIEF DESCRIPTION OF THE DRAWINGS

FIG. 1 is an assembly view, in perspective, of the preferred embodiment;

FIG. 2 is a perspective view of the preferred embodiment in the "set" position with the door member in its open position;

FIG. 3 is a side elevation of the preferred embodiment in the "set" position with the door member restrained in its open position by the surface on which the trap rests;

FIG. 4 is a side elevation of the preferred embodiment in an unstable transition as the enclosure tilts under the weight of a rodent and the door is free to rotate closed;

FIG. 5 is a perspective view of the preferred embodiment with the door member in the closed position;

FIG. 6 is a side elevation of the preferred embodiment with the door member in its closed position and restrained from opening by its contact with the surface on which the trap rests;

FIG. 7 is a partial perspective view of the entrance opening and door of an alternative embodiment with the door open; and FIG. 8 is a partial perspective view of the alternate embodiment of FIG. 7 with the door closed.

DETAILED DESCRIPTION OF THE PREFERRED EMBODIMENT

The trap consists of two discrete parts, whose proportions will be determined by the size of the animal to be trapped. Referring to FIG. 1, there is illustrated an elongated box or housing 20, having a longitudinal axis running lengthwise of the housing. The length of the housing approximates slightly more than twice the body length of the animal to be trapped. The housing, hereafter referred to as the "enclosure," is open at one end with an integral fulcrum 21 located at the approximate midpoint of the bottom exterior surface of said enclosure. The enclosure 20 may tilt, or "teeter" or "seesaw," about the axis of the fulcrum which axis is transverse to the longitudinal axis of the housing as illustrated. The housing includes short, cylindrical appendages 22 on each side exterior surface which serve as mounting pivots for the attachment of a door 15 to the enclosure 20 and about which the door 15 may rotate. The door 15 consists of a curved member 9 conforming to the shape of the open end 12 of the enclosure 20, with two elongated side panels 16, each containing a hole 10 through which the enclosure's cylindrical appendages 22 may protrude, thereby facilitating mounting of the door 15 to said enclosure 20, and about which said door 15 may rotate between an open and closed position with respect to the enclosure opening 12. The curvature of the curved door member 9 and the arc through which said member may rotate conforms to an arc on the circumference of a circle whose center is the pivotal axis 18 between the two appendages 22 on the enclosure 20.

Referring to FIG. 3, in the "set" position, the enclosure 20 is arranged so that its open end 12 is downwardly inclined with respect to the support surface 17 on which the enclosure 20 rests, and its closed end 13 is therefore upwardly inclined. The door member 15 is positioned with its curved surface 9 uppermost and side panel corners or trigger members 14 in contact with the surface 17. The enclosure opening 12 is now unobstructed and will permit entry of a rodent. Gravity would cause the door 15 to rotate counterclockwise to the closed position were it not for the surface 17 obstructing the closing arc of the door side panel corner 14. Said corner 14 is free to traverse a countercockwise arc about pivotal axis 22 only when the inclination of the enclosure 20 is altered so that the open end 12 of said enclosure is lifted a sufficient distance to prevent surface 17 from obstructing said arc. FIG. 2 is a perspective view of FIG. 3.

Referring to FIG. 4, this alteration of inclination will first occur when a rodent 29 enters the enclosure 20 seeking bait 11 which has been placed in the closed end 13 of the enclosure. When the rodent passes fulcrum 21 by a distance, which, in combination with the rodent's weight, is sufficient to produce a clockwise moment of the enclosure about the fulcrum 21, the entire trap will tilt and the enclosure's inclination will change, allowing the door 15 to rotate shut under gravity. The bottom edge 19 of door surface 9 will strike the front edge 28 of the bottom of the enclosure 20, terminating the closing rotation.

Referring to FIG. 6, the entrapped rodent cannot lift the door because door side panel corner 14 is obstructed from traversing an opening arc by the surface 17 whenever the enclosure 20 is downwardly inclined. Said enclosure will downwardly incline toward whichever end the rodent chooses to occupy. Therefore, the application of a gravity overcoming force is capable of rotating the door open only when the rodent is at the end 13 opposite the door 15. A further deterrent to opening the door 15 is offered by the curved interior surface 9 of the door sealing the enclosur's entrance opening 12. Any perpendicular force applied at any point on the interior surface 9 of the door is everywhere perpendicular to the pivotal axis 18, FIG. 1, about which the door must rotate, and therefore affords no rotational torque. The slippery, smooth interior surface 9 discourages application of a nonperpendicular force. FIG. 5 is a perspective view of FIG. 6.

The entrapped rodent can be disposed of by turning the enclosure 20 upside down, which will permit gravity to rotate the door 15 to an open position. The door 15 is composed of a transparent material allowing viewing of the trapped animal so as to allow disposal of the animal after it has been determined that it has died of asphyxiation.

Referring to FIGS. 7 and 8, an alternate embodiment is illustrated in which the door surface 24 is flat instead of curved, and the location of the pivotal axis 23 is located higher and forward of the corresponding point on the preferred embodiment. The enclosure opening 27, when viewed in profile, is also flat, allowing the door surface 24 to seal the entrance when closed. Referring to FIG. 7, the door is shown in the open position with door side panel corner 25 in contact with the surface, which restrains the door from rotating closed under gravity. When the enclosure's entrance end is lifted, as before, the door will rotate closed, sealing the entrance opening. Referring to FIG. 8, door side panel corner 26 is in contact with the surface when the door is closed and the enclosure 20 is downwardly inclined. A door opening rotation is prevented by the contact of door side panel corner 26 with the surface. The interior surface of the door is not as resistant to an opening force as is the curved door surface of the preferred embodiment.

It can be seen by this alternate arrangement that the shape of the door and location of said door's pivotal axis is flexible, and while such variations are possible and obvious to one skilled in the art, they do not exceed the spirit and scope of this invention.

It is anticipated that all flat enclosure surfaces that join at right angles will in fact be curved at their junction to accommodate manufacturing requirements and enhance enclosure strength, and that this in no way alters the functioning of the trap, as described. Such curvature, especially where the top surface of the enclosure joins the side surface, diminishes "gripability" and will discourage a curious rodent from climbing on the enclosure exterior and accidentally altering its inclination.

What is claimed is:

1. An animal trap, comprising:
   a housing defining an enclosure having an entrance opening therein and short cylindrical appendages adjacent the entrance opening;
   an integral fulcrum at the approximate midpoint of the bottom exterior surface of the enclosure, such fulcrum permitting the entire enclosure to assume a downward inclination toward whichever end of the enlosure a trapped animal chooses to occupy;
   a door member attached to the exterior of the enclosure and pivoting thereon in an arc between positions allowing access through, and closure of, said entrance opening;
   said door member consisting of a surface conforming to the shape of the open end of the enclosure, and two sides, each side having a hole which permits the door member to be pivotally mounted on the short cylindrical appendages on the enclosure; and
   said appendages on the enclosure exterior located horizontally and vertically on the side of the enclosure so as to facilitate a pivotal axis such that: (a) an arc is provided for the door surface to traverse so that part of the arc affords closure of the entrance opening and a contiguous part of the arc allows the entrance opening to be unobstructed, and (b) an arc path is provided for a point on the door member side panel opposite the door surface, such that, when the trap is viewed in profile, the arc path pass beneath the enclosure bottom surface whenever the door is in transition from an opened to closed or closed to opened position whereby the surface on which the enclosure rests prevents rotation of the door whenever the enclosure assumes a downward inclination toward the end thereof corresponding to the entrance opening to facilitate such obstruction.

2. The animal trap of claim 1, consisting of an unstable, tilting enclosure, upon which an externally mounted rotating door member is restrained from rotating whenever said enclosure has been tilted so that its door end is downwardly inclined and when tilted so that the door end is upwardly inclinded, the door is free to, and will, rotate from opened to closed under gravity, and is free to rotate from closed to opened if an external opening force is applied.

3. The animal trap of claim 1, consisting of a one-piece plastic enclosure, upon which is externally mounted said door member and being a one-piece gravity operated door member whose surface is free to rotate through an arc which is extrior to the enclosure body, and covers said enclosure's opening when in the closed position.

4. The animal trap of claim 1, which utilized the position and weight of the trapped animal within the enclosure to secure the door in the closed position.

5. The animal trap of claim 1, whose door member, when closed, presents to the trapped animal a surface resistant to the application of an opening force, said surface consists of a smooth, slightly curved surface of uniform radius, and everywhere perpendicular to, the axis about which said surface rotates whereby a perpendicular force applied to such a surface offers no rotational torque and the uniform smoothness of the surface provides a low coefficient of friction which minimizes the rotational component of whatever nonperpendicular force might be applied.

6. The animal trap of claim 1, which permits disposal of the trapped animal by simply inverting the trap, which allows the door to fall open by force of gravity; and whose door is transparent to permit viewing of the animal in order to determine if it is still alive.

7. The animal trap of claim 1, whose unstable, tilting enclosure is designed to alternate tilt inclination whenever the rodent seeking bait at the closed end of the enclosure disposes itself at a distance from the fulcrum such that its weight in combination with said distance, provides sufficient moment to tilt the enclosure in a downward direction corresponding to the location of the rodent.

8. In an animal trap adapted to be positioned on a substantially flat support surface, the combination which comprises:

(a) an elongated housing having an open and a closed end;

(b) fulcrum means secured to the housing intermediate the ends thereof for allowing the housing to pivot about a fulcrum axis traverse to the longitudinal axis of the housing so that only one end of the housing rests on the support surface at a time; and (c) a door member pivotally mounted to the housing adjacent the open and thereof and having portions engagable with the support surface, said door member being responsive to the pivotal movement of the housing from a position where the open end thereof rests on the support surface to a position where the open end thereof is free of the support surface for closing the open end of the housing, the door member having a center of gravity offset from the pivotal mounting thereof so that the door member is biased toward the closed position at all times.

9. The animal trap of claim 8 wherein the door includes a triggering member having an end surface which engages the support surface to hold the door in its open position when the housing is pivoted toward its open end and which is disengaged from the support surface when the housing is pivoted toward its closed end or when the door is in its closed position, whereby an animal of a predetermined weight entering the trap and traversing beyond the fulcrum axis will cause the housing to pivot, disengage the open end of the housing and the triggering member from the support surface and allow the door to close and remain closed.

* * * * *